United States Patent
Suijker et al.

(10) Patent No.: US 12,376,612 B2
(45) Date of Patent: Aug. 5, 2025

(54) EDIBLE CONCENTRATE COMPRISING MICROFIBRILLATED CELLULOSE

(71) Applicant: Conopco Inc., Englewood Cliffs, NJ (US)

(72) Inventors: Michael Jacobus Suijker, Vlaardingen (NL); Krassimir Petkov Velikov, Vlaardingen (NL); Panayiotis Voudouris, Nijmegen (NL)

(73) Assignee: Conopco Inc., Englewood Cliffs, NJ (US)

( * ) Notice: Subject to any disclaimer, the term of this patent is extended or adjusted under 35 U.S.C. 154(b) by 593 days.

(21) Appl. No.: 16/483,750

(22) PCT Filed: Jan. 22, 2018

(86) PCT No.: PCT/EP2018/051453
§ 371 (c)(1),
(2) Date: Aug. 6, 2019

(87) PCT Pub. No.: WO2018/145886
PCT Pub. Date: Aug. 16, 2018

(65) Prior Publication Data
US 2020/0015504 A1  Jan. 16, 2020

(30) Foreign Application Priority Data
Feb. 9, 2017  (EP) .................... 17155323

(51) Int. Cl.
*A23L 23/10* (2016.01)
*A23L 29/262* (2016.01)

(52) U.S. Cl.
CPC ............. *A23L 23/10* (2016.08); *A23L 29/262* (2016.08); *A23V 2002/00* (2013.01)

(58) Field of Classification Search
CPC ............................... A23L 23/10; A23L 29/262
See application file for complete search history.

(56) References Cited

U.S. PATENT DOCUMENTS

| | | | |
|---|---|---|---|
| 3,966,993 A | 6/1976 | Luck | |
| 4,659,388 A | 4/1987 | Innami et al. | |
| 5,342,636 A | 8/1994 | Bakshi et al. | |
| 5,487,419 A | 1/1996 | Wibel | |
| 6,485,767 B1 * | 11/2002 | Cantiani | A23L 29/262 426/570 |
| 2005/0272836 A1 * | 12/2005 | Yaginuma | A23L 29/244 524/27 |
| 2008/0299268 A1 | 12/2008 | Achterkamp et al. | |
| 2010/0099648 A1 | 4/2010 | Debon et al. | |
| 2010/0178366 A1 | 7/2010 | Gehin-Delval et al. | |
| 2017/0183555 A1 * | 6/2017 | Lillandt | D21H 17/25 |

FOREIGN PATENT DOCUMENTS

| | | |
|---|---|---|
| CN | 101594788 A | 12/2009 |
| CN | 101772307 A | 7/2010 |
| CN | 102099412 | 6/2011 |
| CN | 103757976 | 4/2014 |
| CN | 104284904 | 1/2015 |
| CN | 104854276 | 8/2015 |
| EP | 0295865 A2 | 12/1988 |
| EP | 0537554 | 4/1993 |
| EP | 1048690 | 11/2000 |
| EP | 1839499 | 10/2007 |
| EP | 2002732 A1 | 12/2008 |
| EP | 3123875 A1 | 2/2017 |
| JP | 58190369 | 11/1983 |
| JP | 3333290 B2 | 10/2002 |
| JP | 2008113572 | 5/2008 |
| WO | WO9502966 | 2/1995 |
| WO | 2004044285 A2 | 5/2004 |
| WO | 2007068402 A1 | 6/2007 |
| WO | 2008062057 A1 | 5/2008 |
| WO | WO2010/007483 A1 | 1/2010 |
| WO | 2012159873 A1 | 11/2012 |
| WO | WO2013/150475 A1 | 10/2013 |
| WO | WO2014091212 A1 | 6/2014 |
| WO | 2015128155 A1 | 9/2015 |
| WO | 2015193122 A1 | 12/2015 |

OTHER PUBLICATIONS

WO-2015166141-A1, Nov. 2015, Lillandt. (Year: 2015).*
Research Progress on Polymeric Composites Based on Microfibrillated Cellulose; Dec. 31, 2015; 43-51; 8.
Properties and stability of oil in water emulsions stabilized by microfibrillated cellulose from mangosteen rind; Dec. 31, 2015; 690-699; 43.

* cited by examiner

Primary Examiner — Stephanie A Cox
(74) Attorney, Agent, or Firm — B.V. Nederlandsch Octrooibureau

(57) ABSTRACT

The invention relates to an edible concentrate comprising, by weight of the concentrate:
  5-99 wt. % of oil;
  0-10 wt. % of water; and
  1-95 wt. % of texturizing particles;
wherein said texturizing particles have a particle size in the range of 0.5-5,000 micrometre and comprise:
  at least 3 wt. % microfibrillated cellulose (MFC);
  at least 20 wt. % water-soluble filler; and
  less than 10 wt. % water.
The texturizing particles contained in the edible concentrate of the present invention offer the advantage that they impart a creamy, smooth or pulpy mouthfeel, depending on the diameter of the texturizing particles.

18 Claims, No Drawings

EDIBLE CONCENTRATE COMPRISING MICROFIBRILLATED CELLULOSE

FIELD OF THE INVENTION

The invention relates to an edible concentrate comprising texturizing particles that contain microfibrillated cellulose and water-soluble filler.

The invention further relates to a process of manufacturing such an edible concentrate.

BACKGROUND OF THE INVENTION

Cellulose is an organic compound with the formula $(C_6H_{10}O_5)_n$, a polysaccharide consisting of a linear chain of several hundred to many thousands of β(1→4) linked D-glucose units. Cellulose is an important structural component of the primary cell wall of green plants, many forms of algae and the oomycetes. Some species of bacteria secrete it to form biofilms. Plant-derived cellulose is usually found in a mixture with hemicellulose, lignin, pectin and other substances, while bacterial cellulose is quite pure.

Cellulose is a straight chain polymer: unlike starch, no coiling or branching occurs, and the molecule adopts an extended and rather stiff rod-like conformation, aided by the equatorial conformation of the glucose residues. The multiple hydroxyl groups on the glucose from one chain form hydrogen bonds with oxygen atoms on the same or on a neighbour chain, holding the chains firmly together side-by-side and forming microfibrils with high tensile strength. This confers tensile strength in cell walls, where cellulose microfibrils are meshed into a polysaccharide matrix.

Compared to starch, cellulose is also much more crystalline. Whereas starch undergoes a crystalline to amorphous transition when heated beyond 60-70° C. in water (as in cooking), cellulose requires a temperature of 320° C. and pressure of 25 MPa to become amorphous in water. Several different crystalline structures of cellulose are known, corresponding to the location of hydrogen bonds between and within strands.

Cellulose consists of crystalline and amorphous regions. By treating it with strong acid, the amorphous regions can be chemically broken up, thereby producing nanocrystalline cellulose.

Microfibrillated cellulose (MFC), also referred to as nanofibrillated cellulose, is the term used to describe a material that is composed of cellulose microfibrils (or cellulose nanofibrils) that can be isolated from disrupted and disentangled cellulose containing primary or secondary plant cell material or pellicles (in the case of bacterial cellulose). These cellulose microfibrils typically have a diameter of 3-70 nanometres and a length that can vary within a wide range, but usually measures several micrometres. Aqueous suspensions of MFC are pseudo-plastic and exhibit a property that is also observed in certain gels or thick (viscous) fluids, i.e. they are thick (viscous) under normal conditions, but flow (become thin, less viscous) over time when shaken, agitated, or otherwise stressed. This property is known as thixotropy. MFC can be obtained and isolated from a cellulose containing source through high-pressure, high temperature and high velocity impact homogenization, grinding or microfluidization.

U.S. Pat. No. 6,485,767 describes a process for the preparation of a food formulation comprising the steps of:
providing a starting food or food formulation,
mixing said starting food or food formulation with an amount greater than 0% and less than 20% by weight, relative to the total weight of the food formulation, of a combination of amorphous cellulose microfibrils in dry form having a degree of crystallinity of less than or equal to 50%, with at least one polyhydroxylated compound, to obtain the food formulation, and
recovering the obtained food formulation.

EP-A 1 048 690 discloses a cellulose-containing composite comprising 20-99% by weight of a fine cellulose and 1-80% by weight of at least one low-viscosity water-soluble dietary fibre selected from the group consisting of 1) a hydrolyzed gallactomannan, 2) an indigestible dextrin and 3) a mixture of a polydextrose and xanthan gum and/or gellan gum, wherein the total amount of gellan gum and xanthan gum is 0.1% by weight or more but less than 3% by weight of the composite, in which composite the average particle size of the fine cellulose is 30 µm or less when the composite is dispersed in water.

EP-A 0 537 554 relates to a water-dispersible complex comprising from 50 to 98% by weight fine cellulose particles and from 2 to 50% by weight water-soluble gum and/or hydrophilic material, as solid component ratio by weight. The composition of the complex is such that: an aqueous dispersion of the complex comprises particles having a particle size of at least 10 µm in a particle size distribution of not more than 40%; the aspect ratio of the particles having a particle size of at least 10 µm is not higher than 3.0 when the ratio of the particles having a particle size of at least 10 µm in the particle size distribution is from 5 to 40%; and the dispersion has a colloid fraction of at least 65%. Example 7 shows that the cellulose dispersion was passed twice through a high-pressure pulverizing apparatus at 1,300 kg/cm² to provide a pasty cellulose.

U.S. Pat. No. 3,966,993 relates to convenience sauce and gravy mixes, and more particularly to those that are a solid bar form at normal room temperature and are convertible on mixing with aqueous liquid into edible sauces. The process comprises an intimately mixing together 40 to 60 parts of melted, edible emulsified triglyceride fat having acyl radicals of preponderantly $C_{16}$-$C_{18}$ chain length and having a Wiley melting point of about 100° to 125° F. and a minimum of 30% Solid Fat Index at 70° F., and 15 to 40 parts of farinaceous flour, and 5 to 45 parts of condiment solids having particle size not substantially greater than about 30 microns; b. tempering the resulting mixture in an agitated tempering zone until fat crystals are generated, forming a solid bar of the tempered mixture under conditions precluding complete remelting of said fat crystals; and c. cooling the resulting bar until it is dimensionally stable at room temperature.

However, water insoluble dietary fibre material, in particular microfibrillated cellulose, when applied in oily pasty or oil/fat continuous edible concentrates, has the drawback that it can introduce a chalky, sandy or gritty mouthfeel in the prepared sauces or dishes, due to the presence of perceptible dense particles of water-insoluble material. This is particularly perceived as problematic in products where the high ionic strength suppresses swelling of the microfibrillated cellulose.

It is therefore an object to provide an edible concentrate for the preparation of soups, dressings, mayonnaise, dips, water continuous spreads, desserts, thick sauces and dishes or to be used as cooking aid, such as roasting paste and baking paste.

Surprisingly, it has been found that an oil-continuous, edible concentrate comprising texturizing particles comprising microfibrillated cellulose containing particles that provide special texture properties upon dilution with aqueous liquid, but without imparting a chalky, sandy or gritty mouthfeel.

SUMMARY OF THE INVENTION

The inventors have developed an edible concentrate comprising microfibrillated cellulose (MFC) containing particles that provides special texture properties upon reconstitution with aqueous liquid.

The edible concentrate of the present invention comprises, by weight of the concentrate:
- 5-99 wt. % of oil;
- 0-10 wt. % of water; and
- 1-95 wt. % of texturizing particles;

wherein said texturizing particles have a particle size in the range of 0.5-5,000 micrometre and comprise:
- at least 3 wt. % microfibrillated cellulose (MFC);
- at least 20 wt. % water-soluble filler; and
- less than 10 wt. % water.

The concentrate of the present invention can suitably be dispersed in aqueous liquids to prepare, for instance, a soup, a sauce or a gravy. The texturizing particles in the present concentrate are easily hydrated and, upon reconstitution with water, the texturizing particles together with the fat component produce an emulsion with a creamy, smooth or pulpy mouthfeel, depending on the diameter of the texturizing particles.

The texturizing particles of the present invention when dispersed in water to form soft porous particles due to the dissolution of the water-soluble filler and the cohesion between the remaining cellulose microfibrils in the hydrated texturizing particles. The impact of these soft hydrated MFC particles on the mouthfeel of the reconstituted product is very special. If the hydrated particles are very small (e.g. <30 μm) they impart a creamy mouthfeel. If the particles are relatively large (e.g. >100 μm) they impart a pulpy mouthfeel. The viscosifying effect of the MFC in the hydrated texturizing particles is limited. However, if the hydrated texturizing particles in a reconstituted aqueous food product are destroyed by e.g. high shear homogenization, the viscosity of the product is increased substantially.

The invention also relates to a process of preparing the aforementioned edible concentrate, said process comprising:
- providing texturizing particles having a diameter in the range of 0.5-5,000 micrometre and comprising at least 5 wt. % of MFC; at least 20 wt. % of water-soluble filler; and less than 12% water; wherein the MFC and the water-soluble filler together represent at least 40 wt. % of the texturizing particles; and
- mixing the texturizing particles with one or more other particulate edible ingredients.

The invention also relates to a particulate savoury food product comprising 1-90 wt. % of a granulate of the aforementioned edible concentrate.

The invention also relates to the use of the aforementioned edible concentrate of an aqueous foodstuff, said use comprising mixing said edible concentrate with aqueous liquid.

DETAILED DESCRIPTION OF THE INVENTION

Accordingly, a first aspect of the invention relates an edible concentrate comprising, by weight of the concentrate:
- 5-99 wt. % of oil;
- 0-10 wt. % of water; and
- 1-95 wt. % of texturizing particles;

wherein said texturizing particles have a particle size in the range of 0.5-5,000 micrometre and comprise:
- at least 3 wt. % microfibrillated cellulose (MFC);
- at least 20 wt. % water-soluble filler; and
- less than 10 wt. % water The term "microfibrillated cellulose" or "MFC", as used herein, unless indicated otherwise, refers to water-insoluble cellulose microfibrils, more particularly to water-insoluble cellulose microfibrils having a length L and a mean diameter D, wherein the ratio L/D is at least 30 and D is in the range of 1-50 nm. These cellulose microfibrils are no longer meshed into a cell wall polysaccharide matrix as a result of a defibrillation treatment, e.g. high pressure homogenization.

The term "oil" as used herein refers to glycerides selected from triglycerides, diglycerides, monoglycerides, phosphoglycerides and combinations thereof. The oil can be liquid, solid or semi-solid at ambient temperature (20° C.).

Whenever reference is made herein to the water content of the concentrate, unless indicated otherwise, this includes all the water that is present in the concentrate.

The term "diameter" as used herein in relation to a particle, unless indicated otherwise, refers to the average equivalent spherical diameter of said particle. Likewise, unless indicated otherwise, the term "diameter" as used herein in relation to a microfibril, refers to the average diameter of said microfibril.

The particle size distribution of particulate ingredients can be determined, for instance, by means of laser diffraction. Care should be taken that loose aggregates of particles are dissociated before the particle size measurements.

The edible concentrate of the present invention preferably is a granulate, a shaped article or a paste. In case the concentrate is a granulate, the granules that make up the granulate contain:
- 5-99 wt. % of oil;
- 0-10 wt. % of water; and
- 1-95 wt. % of the texturizing particles.

In a preferred embodiment of the invention, the edible concentrate is a granulate comprising at least 70 wt. %, more preferably at least 80 wt. % and most preferably at least 90 wt. % of granules having a diameter in the range of 100-5,000 μm, more preferably of 150-2,000 μm, most preferably of 180-1,500 μm. The particle size distribution of the granulate can be suitably determined using a set of sieves of different mesh sizes.

In another preferred embodiment, the concentrate is a shaped article, such as a cube. Typically the shaped article has a weight in the range of 0.1 to 5 grams, more preferably 0.5 to 2.5 grams and most preferably 0.75 to 1 grams.

In yet another preferred embodiment, the concentrate is a paste. Typically, the paste contains at least 8 wt. %, more preferably at least 10 wt. % and most preferably 15-60 wt. % oil. Even more preferably, the concentrate is a savoury paste containing 3-50 wt. %, more preferably 5-30 wt. % of salt selected from sodium chloride, potassium chloride and combinations thereof; and 1-50 wt. %, preferably 2-40 wt. % of pieces of plant material selected from herbs, spices, vegetables and combinations thereof.

The edible concentrate typically contains at least 1 wt. % of the texturizing particles having a diameter in the range of 2-1,000 micrometre, more preferably at least 1 wt. % of the texturizing particles having a diameter in the range of 10-500 micrometre, most preferably at least 1 wt. % of the texturizing particles having a diameter in the range of 20-300 micrometre.

Besides the texturizing particles the edible concentrate contains one or more other particulate ingredients. Examples of such particulate ingredients include particles that contain dry plant material, dry meat, salt (e.g. NaCl, KCl and monosodium glutamate), sugar (e.g. sucrose, lactose, glucose, fructose) hydrolysed protein, yeast extract, thickener, gelling agent, flavouring and combinations thereof.

The water content of the edible concentrate preferably does not exceed 8 wt. %, more preferably it does not exceed 7 wt. %, even more preferably it does not exceed 6 wt. %, most preferably it does not exceed 5 wt. %.

The oil and the texturizing particles together preferably represent at least 30 wt. %, preferably at least 50 wt. % of the concentrate.

The edible concentrate of the present invention preferably comprises 3-50 wt. % of salt selected from sodium chloride, potassium chloride and combinations thereof. Typically, edible concentrate comprises 3-50 wt. %, more preferably 5-40 wt. % and most preferably 8-30 wt. % of salt selected from sodium chloride, potassium chloride and combinations thereof.

The MFC that is contained in the food product typically comprises at least 80 wt. % of cellulose microfibrils having a length L and a mean diameter D, wherein the ratio L/D is at least 10 and D is in the range of 3-70 nm.

The MFC employed in accordance with the present invention preferably originates from parenchymal tissue from fruits, roots, bulbs, tubers, stalks, seeds or combination thereof. More preferably, the MFC originates from fruits.

Examples of suitable sources for MFC include citrus fruit, tomato fruit, peach fruit, pumpkin fruit, kiwi fruit, apple fruit, mango fruit, sugar beet, sugar cane, beet root, turnip, parsnip, maize, oat, wheat, peas or combinations thereof. More preferably, the MFC originates from citrus fruit, tomato fruit, sugar cane, sugar beet or a combination thereof. Most preferably, the MFC originates from citrus fruit, tomato fruit or a combination thereof.

The MFC in the texturizing particles is typically produced from parenchymal material that besides cellulose contains hemicellulose. Typically, the texturizing particles contain 0-60 wt. % of hemicellulose from the same source(s) as the MFC. More preferably, the texturizing particles contain 5-50 wt. %, most preferably 10-40 wt. % of hemicellulose and from the same source(s) as the MFC.

The cellulose microfibrils of the MFC typically have a mean diameter smaller than 30 nm, more preferably smaller than 20 nm, most preferably smaller than 15 nm.

The average degree of crystallinity of the MFC typically is less than 40%, more preferably less than 35% and most preferably less than 30%.

The water-soluble filler that is contained in the texturizing particles is preferably selected from maltodextrin, sucrose, lactose, glucose, fructose, pectin, starch, salt, monosodium glutamate, sodium citrate and combinations thereof. More preferably, the water-soluble filler is selected from maltodextrin, sucrose, lactose, glucose, fructose and combinations thereof. Most preferably, the water-soluble filler is maltodextrin.

The edible concentrate of the present invention preferably comprises 3-60 wt. %, more preferably 5-50 wt. % of the texturizing particles.

The texturizing particles of the present invention preferably contain at least 5 wt. %, more preferably 8-50 wt. % and most preferably 10-40 wt. % of MFC.

The water-soluble filler typically constitutes at least 30 wt. %, more preferably 35-90 wt. % and most preferably 40-88 wt. % of the texturizing particles.

The texturizing particles of the present invention preferably contain at least 5 wt. % of MFC and at 30 wt. % of water-soluble filler.

The water content of the texturizing particles preferably does not exceed 10 wt. %, more preferably it does not exceed 9 wt. % and most preferably it does not exceed 8 wt. %.

The texturizing particles in the edible concentrate may suitably contain other ingredients besides MFC and water-soluble filler. In some embodiments the texturizing particles comprise a stabilizer selected from the group consisting of sodium phosphate, potassium phosphate, calcium phosphate magnesium phosphate and zinc phosphate. Preferably, the stabilizer is selected from the group consisting of monocalcium phosphate, dicalcium phosphate and tricalcium phosphate. The MFC and water-soluble filler together preferably represent at least 40 wt. % of the texturizing particles. The combination of MFC and water-soluble filler more preferably constitutes at least 50 wt. %, even more preferably at least 60 wt. % and most preferably at least 70 wt. % of the texturizing particles.

The combination of MFC, hemicellulose and water-soluble filler preferably constitutes at least 60 wt. %, more preferably at least 70 wt. % and most preferably at least 80 wt. % of the texturizing particles.

The MFC and the water-soluble filler preferably form an intimate mixture within the texturizing particles.

According to a very preferred embodiment, the texturizing particles employed in accordance with the present invention are very homogeneous. This may be achieved by preparing a suspension of cellulose fibres and applying conditions of extremely high shear before drying the suspension. The water-soluble filler can be added before or after the application of high shear. The high shear conditions ensure that the cellulose microfibrils are largely disentangled. During drying the spaces between the spaces between the disentangled microfibrils are filled with water-soluble filler.

Microscopic images of the texturizing particles when dispersed in water of the present invention show that particles are indeed very homogeneous. This homogeneity of the particle microstructure can be quantified by measuring the orientation ("anisotropy" parameter) of the fibrils in individual particles using image analysis tools as described by Boudaoud et al. (Fibril Tool, *an ImageJ plug-in to quantify fibrillar structures in raw microscopy images*, Nature Protocols, 2014, 9(2), 457-463. This method quantifies the anisotropy of fibril arrays within solid materials or within solid particles in dispersion, directly from raw images obtained by any form of microscopy.

The "anisotropy" parameter of the texturizing particles of the present invention is determined after these particles have been dispersed in water. The "average orientation" parameter is calculated by first determining the average of the "anisotropy" parameter per particle over its (particle's) cross section area (in pixel^2) and by subsequently averaging the outcome for all the selected particles. The exact procedure for measuring the "average orientation" parameter is described in the Examples.

Cellulose microfibrils that are present in cell walls are highly oriented (and form dense areas). In microfibrillated cellulose the cellulose microfibrils are much more randomly oriented as a result of the defibrillation. The smaller the "average orientation" parameter, the more homogeneously and disorderely the microfibrils are distributed, and the fewer dense areas are observed. The "average orientation" of cellulose microfibrils in microfibrillated cellulose is generally inversely proportional to the level of shear that was used to defibrillate the cellulose fibres.

Typically, the texturizing particles have an "average orientation" of less than $4.2\times10^{-6}$, more preferably of less than $3.5\times10^{-6}$, even more preferably of less than $3.0\times10^{-6}$ and most preferably of less than $2.8\times10^{-6}$.

In accordance with one embodiment of the invention the edible concentrate contains at least 0.5 wt. %, preferably 1-60 wt. % and most preferably 5-50 wt. % of texturizing particles having a diameter in the range of 0.5-50 micrometre. The inventors have found that texturizing particles having such a small diameter offer the advantage that upon reconstitution with aqueous liquid they form hydrated particles that impart a thick, smooth texture without being discernible as particles. Preferably, after full hydration 50-100% of the texturizing particles have a diameter in the range of 1-50 micrometre.

According to another embodiment of the edible concentrate contains at least 1 wt. %, more preferably 3-60 wt. % and most preferably 5-50 wt. % of texturizing particles having a diameter of at least 50 micrometres. These relatively large texturizing particles impart a special pulpy texture after reconstitution with sufficient aqueous liquid.

Another aspect, the present invention relates to a particulate savoury food product comprising 1-90 wt. % of a granulate according to the present invention and one or more other particulate edible ingredients. The food product preferably further contains pieces of plant material selected from vegetables, herbs, spices and combinations thereof.

The particulate savoury food product of the present invention preferably is a packaged food product. The instant food product may suitably be packaged in, for instance, a sachet or a container. In a preferred embodiment, the particulate savoury food product is selected from an instant soup, an instant sauce and an instant gravy.

Another aspect of the present invention relates to a process of preparing edible concentrate as defined herein before, said process comprising:
  providing texturizing particles having a diameter in the range of 0.5-5,000 micrometre and comprising at least 5 wt. % of MFC; at least 20 wt. % of water-soluble filler; and less than 12% water; wherein the MFC and the water-soluble filler together represent at least 40 wt. % of the texturizing particles; and
  mixing the texturizing particles with oil or/and melted fat.

In a particularly preferred embodiment, the aforementioned process comprises the additional step of packaging the mixture of texturizing particles and other particulate edible ingredients, e.g. in a sachet or a container.

Yet another aspect of the invention relates to the use of edible concentrate product as defined herein before or a particulate savoury food product as defined herein before in the preparation of an aqueous foodstuff, said use comprising mixing 1 part by weight of edible concentrate with at least 2 parts by weight of aqueous liquid.

According to one embodiment the edible concentrate is mixed with hot aqueous liquid having a temperature of at least 50° C.

In accordance with another embodiment, the edible concentrate is mixed with cold water having a temperature of less than 30° C. In one embodiment, the resulting mixture is subsequently heated to a temperature in excess of 70° C.

Preferably, the use comprising mixing 1 part by weight of the edible concentrate product with 4-50 parts by weight of aqueous liquid.

The aqueous liquid that is mixed with the instant food product typically contains at least 80 wt. %, more preferably at least 80 wt. % of water.

The invention is further illustrated by the following non-limiting examples.

EXAMPLES

Example 1—Texturizing Particles

Preparation of Texturizing Particles Composed of MFC-Containing Citrus Fibre and Maltodextrin (Wt./Wt.≈1:5).

Citrus fibre (Herbacel AQplus type N, from Herba food), maltodextrin (MD20 P, from AVEBE Veendam Holland), and tricalcium diphosphate were dispersed in demineralized water (20° C.) using an Ultra-turrax at high speed for 15 min to prepare 300 kg of an aqueous suspension. The composition of the suspension is shown in Table 1.

TABLE 1

| Sample 1 | | |
|---|---|---|
| | Wt. % | Kg |
| Citrus fibre | 1.50 | 4.5 |
| Maltodextrin | 7.50 | 22.5 |
| Tricalcium diphosphate | 0.15 | 0.45 |
| Demineralized water | 90.85 | 272.55 |

Next, the suspension was homogenized at 900 bar using a Rannie homogenizer. The homogenized suspension was spray dried in a spray tower with an evaporation capacity of 70 to 100 kg/h (GEA, Niro) with a nozzle pressure of 250 bar.

Comparative Example 1 Preparation of Texturizing Particles Composed of MFC-Containing Citrus Fibre ($TP_{ref}$) (No Maltodextrin Filler)

Citrus fibre (Herbacel AQplus type N, from Herba food) was dispersed in demineralized water (20° C.) using a Silverson L4RT mixer (operating at 5000 rpm using a Slotted Disintegrating Head for 4 min) to prepare 3 kg aqueous suspension. The composition of the suspension is shown in Table 2.

TABLE 2

| Reference 1 | | |
|---|---|---|
| | Wt. % | g |
| Citrus fibre | 1.50 | 45 |
| Demineralized water | 98.9 | 2955 |

Next, the suspension was homogenized at 500 bar using a table-top homogeniser type Panda NS2002H from Niro Soavi S.p.A. The homogenized suspension was spray dried in a Mobile Minor spray dryer from Niro,GEA, with an evaporation capacity of 1 kg/h with a nozzle pressure of 2.5 bar.

Next, the suspension was homogenized single pass at 500 bar using a table top homogeniser type Panda NS2002H, from Niro Soavi S.p.A.

The suspension was spray dried in a Production Minor, using a two fluid nozzle with 0.8 mm opening both from GEA Niro Denmark and a Mono pump Nemo NM005BY06S12B from Netzsch).

The spray drying conditions are summarized in Table 3.

TABLE 3

| | |
|---|---|
| Inlet temperature | 175° C. |
| Atomising pressure of the nozzle | 2.5 bar |
| Outlet temperature | 70° C. |

Example 2—Oil-Continuous Pastes

An oil-continuous paste was prepared (sample 1) and compared to a reference oil-continuous paste (reference 1), as shown in Table 4. The spray dried texturizing particles (example 1—Sample 1) were mixed with oil in a ratio of powder to oil of 1:1. Likewise, a reference oil-continuous paste was prepared by mixing the spray dried MFC (Example 1—Reference 1) with maltodextrin (MD20 P, from AVEBE Veendam Holland) and oil in a ratio of powder to oil of 1:1.

TABLE 4

Edible concentrate - oil continuous pastes

| | Component | Wt. % |
|---|---|---|
| Sample 1 | MFC particles (example 1) | 50 |
| | Rapeseed oil | 50 |
| Reference 1 | MFC particles (comparative example 1) | 8.3 |
| | Maltodextrin | 41.7 |
| | Rapeseed oil | 50 |

43.2 g of each of the edible concentrates of Table 4 were whisked into 300 g cold tap water and brought to boil. The resultant solutions were allowed to simmer for 5-6 minutes, before being evaluated by an expert panel (evaluation of 'appearance' included stirring and pouring of the samples) in glass 300 ml beakers. The results of the evaluation are shown in Table 5.

TABLE 5

| | Appearance | Mouthfeel |
|---|---|---|
| Sample 1 | Thick, a lot of fat eyes | Thick and smooth |
| Reference 1 | Thin, watery, foamy | Thin, watery |

Example 3

In this example the physical stability against gravity driven instability of the paste was assessed visually in glass 300 ml beakers, the results are in table 6.

TABLE 6

| | Physical stability |
|---|---|
| Sample 1 | Stable. Visual separation do not appear even after 10 min. small droplets are visible, not floating or sinking. |
| Reference 1 | Unstable. Visual separation appears after 2-3 min, an oily layer is formed (creaming) and clear sediment was formed. |

Example 4

The average orientation of cellulose microfibrils (from citrus fibre) in the texturizing particles of Examples 1 were determined as described below.

The dry texturizing particles were dispersed into demineralized water in a concentration that corresponds to 0.1 wt. % citrus fibre. A volume of 2 mL of each sample was taken with a Finn pipette (Labsystems 4500, H37095) and deposited in a 2 mL Eppendorf safelock tube. To this 20 μL of a 0.5 w/v % aqueous solution of direct yellow dye was added with a Finn pipette (Labsystems 4027, H56580). The samples were gently shaken to distribute the dye.

For imaging, a sample holder was filled with the dyed sample material. The sample holder consisted of two cover slides separated by a spacer. The spacer was a rectangular glass slide of 3 mm thick with a circular hole (0.5 cm diameter) in which the sample could be deposited.

Imaging was performed on a Leica TCS-SP5 confocal microscope in combination with a DM16000 inverted microscope frame. The Laser (405 Diode, UV) laser emitting at 405 nm was used at a fixed laser power of 25% for imaging with the direct yellow dye. For detection, the system is equipped with PMT (photomultiplier tube) detector at 455 nm-558 nm.

Images were taken at one magnification: at 40× magnification with an oil-immersed 40× with a numerical aperture of 1.25 (section thickness 0.968 μm) using Leica Immersion oil without auto fluorescence conforming to DIN 58884/ISO 8036/1. At 40× magnification a tile scan of 25 by 25 images at a single depth was performed to yield 25 non-overlapping images. Care was taken not to image the edges of the sample holder; images were taken at a few micrometres distance from the edge.

The PMT was adjusted by using the "smart gain" options to prevent over-saturation of the images. It was adjusted such that between 0.0 and 4% of the pixels are saturated. The resolution of the images was set to 1024 by 1024 pixels and a line averaging of 3 was used. Each pixel represented a sample area of 378.8 by 378.8 nm for 40× magnification. After imaging, the individual pictures that make up the tile scan were exported as tiff files with a colour depth of 24 bit RGB without incorporating any scale bar (the reconstructed larger tile images were not used in the image analysis).

A method originally developed Boudaoud et al. (FibrilTool, an ImageJ plug-in to quantify fibrillar structures in raw microscopy images, Nature Protocols, 2014, 9(2), 457-463) based on the concept of nematic tensor, can provide a quantitative description of the anisotropy of fibre arrays and their average orientation in cells, directly from raw images obtained by any form of microscopy. Here with a small modification we use it to quantify the anisotropy of the fibril network within the particles structure. For image analysis the program ImageJ (freeware downloadable from: http://rsbweb.nih.gov/ij/) was used along with its extra plugin fibril tool (http://www.nature.com/nprot/journal/v9/n2/extref/nprot.2014.024-S3.txt) together with Microsoft Excel.

The analysis method consists of the following steps:

Microscopic pictures are inserted to ImageJ by drag and drop double click on the Fibril Tool to select the colour channels select the area of an individual particle by using the polygon tool then click on the area of a particle by using the Tool repeat the process for the rest of the particles under investigation. The process was performed for at least 10 particles per microscopic picture.

The log output gives the average properties of the region
image title
   cell number
x-coordinate of region centroid (scaled)
   y-coordinate of region centroid (scaled)
   area (scaled)
nematic tensor
   average orientation (angle in −90:90 in degrees)
   quality of the orientation (score between 0 and 1)
The results are drawn on an overlay
coordinates of polygon vertices for record The above procedure was repeated for at least thirty randomly chosen microscopic pictures per sample.

The log output tables from the individual pictures were inserted into cells on excel software and the data where further processed as following:

The values of the quality of the orientation were summed and the summed value was divided by the sum area (scaled) value.
   The value of this operation is herein provided as average orientation parameter.

The results are shown in Table 6.

TABLE 6

| Sample | Average orientation |
|---|---|
| Sample 1 | $2.42 \times 10^{-6}$ |
| Reference 1 | $5.04 \times 10^{-6}$ |

The invention claimed is:

1. An oil-continuous edible concentrate comprising, by weight of the concentrate:
 5-99 wt. % of oil;
 0-10 wt. % of water; and
 1-50 wt. % of texturizing particles;
 wherein said texturizing particles have a particle size in the range of 0.5-5,000 micrometre and comprise:
 5-40 wt. % microfibrillated cellulose (MFC);
 at least 20 wt. % water-soluble filler; and
 less than 10 wt. % water.

2. The edible concentrate according to claim 1, wherein the oil and the texturizing particles together represent at least 30 wt. % of the concentrate.

3. The edible concentrate according to claim 1, wherein the MFC and water-soluble filler together represent at least 40 wt. % of the texturizing particles.

4. The edible concentrate according to claim 1, said concentrate further comprising 3-50 wt. % of salt selected from sodium chloride, potassium chloride and combinations thereof.

5. The edible concentrate according to claim 1, wherein the MFC originates from parenchymal tissue from fruits, roots, bulbs, tubers, seeds, stalks or a combination thereof.

6. The edible concentrate according to claim 1, wherein the water-soluble filler is selected from maltodextrin, sucrose, lactose, glucose, fructose, pectin, starch, salt, monosodium glutamate, sodium citrate and combinations thereof.

7. The edible concentrate according to claim 6, wherein the water-soluble filler is selected from maltodextrin, sucrose, lactose, glucose, fructose and combinations thereof.

8. The edible concentrate to claim 1, wherein the texturizing particles contain 8-40 wt. % of MFC and at least 30 wt. % of water-soluble filler.

9. The edible concentrate according to claim 1, wherein the concentrate is a granulate.

10. The edible concentrate according to claim 9, wherein the concentrate is a granulate comprising at least 70 wt. % of granules having a diameter in the range of 100-5,000 µm.

11. The edible concentrate of claim 1, wherein the concentrate is a cube.

12. The edible concentrate of claim 1, wherein the concentrate is a paste.

13. A particulate savoury food product comprising 1-90 wt. % of a granulate according to claim 10 and one or more other particulate edible ingredients.

14. The particulate savoury food product according to claim 13, wherein the food product further contains pieces of plant material selected from vegetables, herbs, spices and combinations thereof.

15. The particulate savoury food product according to claim 13, wherein the food product is selected from an instant soup, an instant sauce and an instant gravy.

16. A process of preparing an edible concentrate according to claim 1, said process comprising:
 providing texturizing particles having a diameter in the range of 0.5-5,000 micrometre and comprising 5-40 wt. % of MFC; at least 20 wt. % of water-soluble filler; and less than 12% water; wherein the MFC and the water-soluble filler together represent at least 40 wt. % of the texturizing particles; and
 mixing the texturizing particles with oil or/and melted fat.

17. Method of preparing an aqueous foodstuff, said method comprising: mixing 1 part by weight of said concentrate of claim 1 with at least 2 parts by weight of aqueous liquid.

18. The method of claim 17, wherein the aqueous foodstuff further comprises pieces of plant material selected from vegetables, herbs, spices and combinations thereof.

* * * * *